United States Patent [19]
Meadows

[11] Patent Number: 5,323,734
[45] Date of Patent: Jun. 28, 1994

[54] LIVESTOCK FEEDER PARTICULARLY ADAPTED FOR FEEDING A ROUND HAY BALE

[76] Inventor: Willard M. Meadows, P.O. Box 284, Cottle, W. Va. 26207, a

[21] Appl. No.: 958,800

[22] Filed: Oct. 9, 1992

[51] Int. Cl.$^5$ .............................................. A01K 5/00
[52] U.S. Cl. .................... 119/51.01; 119/58
[58] Field of Search ............. 119/51.01, 51.03, 58, 119/60, 61; 248/88.7, 431

[56] References Cited

U.S. PATENT DOCUMENTS

| | | | |
|---|---|---|---|
| 514,203 | 2/1894 | Schmidt | 119/61 |
| 3,142,464 | 7/1964 | Zelenitz | 248/188.7 X |
| 3,777,713 | 12/1973 | Deats | 119/60 |
| 3,906,903 | 9/1975 | Vandewater | 119/60 |
| 4,302,139 | 11/1981 | Malish | 119/60 X |
| 4,706,609 | 11/1987 | Delichte | 119/60 |
| 5,000,122 | 3/1991 | Smith | 119/60 X |

FOREIGN PATENT DOCUMENTS 2460613  3/1981  France ................... 119/58

Primary Examiner—Robert P. Swiatek
Attorney, Agent, or Firm—Jacobson, Price, Holman & Stern

[57] ABSTRACT

A livestock feeder of, for example, welded construction, comprises a vertically extending support leg and a plurality of inclined support legs having upper ends secured to the vertical support leg. The vertical support leg extends upward through a bale-supporting platform in the form of a woven wire screen to define a "spear" portion which penetrates the hay bale when the bale is positioned on the screen, to retain the bale on the screen. The woven wire screen is supported on a plurality of horizontally disposed support members having inner ends secured to the vertical support leg and/or the upper ends of the inclined support legs, and outer ends secured to a ring member within which the woven wire screen is disposed. The inclined support legs and the vertical support leg are also interconnected by first brace members and the inclined support legs and the outer ends of the horizontally disposed screen-supporting members are interconnected by second brace members. The woven wire screen may be rigidly secured to the horizontally disposed support members and/or the ring member, or removably secured thereto by wire twists.

19 Claims, 1 Drawing Sheet

LIVESTOCK FEEDER PARTICULARLY ADAPTED FOR FEEDING A ROUND HAY BALE

BACKGROUND OF THE INVENTION

1. Field of the Invention

In general, this invention relates to a livestock feeder particularly adapted for feeding a round hay bale, and more particularly to a livestock feeder which supports the round hay bale in an elevated position with respect to the ground to reduce spoilage, and which is of open construction to reduce the possibility of the heads of the animals from becoming entrapped in the feeder, is easy to load and is readily portable.

2. Description of Prior Art

Livestock feeders which are particularly adapted for the feeding of round or cylindrical hay bales are known in the art, such feeders being disclosed in U.S. Pat. Nos. 3,777,713 to R. A. Deats, 3,906,903 to L. C. Vanderwater, 4,302,139 to E. K. Malish and 4,706,609 to L. G. Delichte.

In general, each of these livestock feeders is of a cylindrical cage type, within which the round hay bale (which may be as much as five feet in diameter and weigh five hundred pounds) is supported directly on the ground or on a solid base member in a slightly elevated position off the ground. Supporting of the hay bale directly on the ground, or on a solid base member closely adjacent the ground, however, is disadvantageous for various reasons. For example, the hay bale tends to absorb moisture from the ground and/or the surrounding atmosphere, causing deterioration of the hay so that it becomes unfit for livestock consumption, resulting in possible losses of up to on the order of 30% of the hay or more in certain instances. This is particularly true in the winter when there is snow on the ground, or in the case of high water due to flooding. Such devices also tend to be unsanitary for these and other reasons.

Further, in certain instances, cylindrical cage devices are undesirable because the livestock, such as cattle, tend to get their horns locked between the members of the cage. Young livestock, such as calves, also can climb inside the cage and trample the hay, again making it unfit for consumption and/or creating unsanitary conditions. These devices, in which the cage generally is relatively heavy and is supported on the ground by a lower ring member, also tend to be difficult to move, particularly when they have become frozen to the ground.

Thus, a need exists for a livestock feeder which is particularly adapted for supporting a round or cylindrical hay bale in an elevated position a substantial distance above the ground with continuous air flow through the bale, so as to prevent loss of hay due to moisture, trampling, unsanitary conditions, and/or flooding; is substantially open about its periphery to prevent livestock from becoming entrapped in the feeder; and is relatively sturdy, yet of a construction so as to be easily portable even when frozen to the ground. Accordingly, a primary purpose of this invention is to provide such a feeder.

SUMMARY OF THE INVENTION

In general, the invention relates to a livestock feeder particularly adapted for feeding a round hay bale, which comprises a horizontal platform mounted on upper ends of a plurality of support legs, for supporting the hay bale in an elevated position with respect to the ground, with a mechanism also being provided for retaining the hay bale on the horizontal platform.

More specifically, one of the support legs is in the form of a vertically disposed shaft member which extends upward through the horizontal platform to provide a "spear" portion for penetrating the hay bale when the hay bale is positioned on the platform. The other support legs, which may be four in number, are inclined and have upper end portions secured to the vertical shaft member, with brace members being provided between intermediate portions of the vertical shaft member and each of the inclined support legs. A plurality of horizontally disposed platform support members have inner end portions secured to the vertical shaft member and/or the inclined support legs, and outer end portions connected to intermediate portions of the inclined support legs by additional brace members. The outer end portions of the horizontal platform support members also are interconnected by a ring member within which the platform is disposed. The platform, which may be a woven wire screen suitably secured to the horizontal platform support members and/or the ring member, is of relatively open construction to permit air flow to the bottom of the hay bale, and through the bale, when the bale is supported thereon.

DETAILED DESCRIPTION OF DISCLOSED EMBODIMENT

Figure 1:
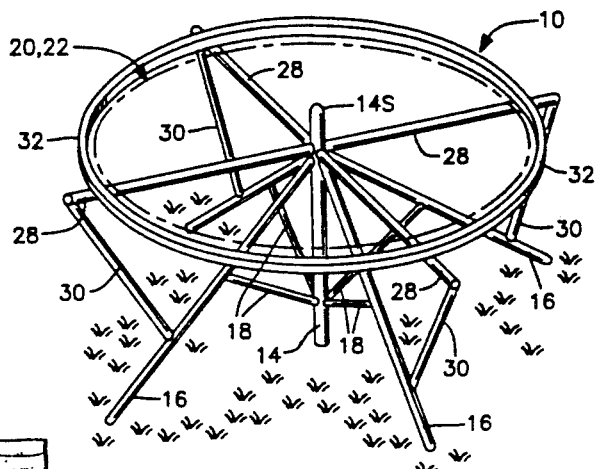
FIG. 1 is an isometric view of a livestock feeder in accordance with the invention, with a round hay bale supporting platform removed and illustrated in phantom.

In general, referring to the drawing, a livestock feeder 10 in accordance with the invention, which is particularly adapted for feeding a round or cylindrical hay bale 12 (best shown in FIG. 2) which may have a diameter on the order of at least five feet and a weight of at least five hundred pounds, is of substantially welded construction and comprises a vertical center support leg or shaft member 14 and four inclined support legs 16. The inclined support legs 16 are disposed at 90 degree intervals about the vertical support shaft 14 and have upper tapered ends welded to respective side portions of the shaft. The inclined support legs 16 also are secured to the vertical support shaft 14 by respective brace members 18 welded at their opposite ends to intermediate portions of the shaft and respective ones of the inclined support legs.

A platform 20, which is mounted on the resultant shaft-and-inclined support leg assembly 14, 16, for supporting the hay bale 12 in a substantially elevated position relative to the ground G (FIG. 2), may be in the form of a circular screen 22 (best shown in FIG. 3) of relatively open-type construction. For example, the screen 22 may be of a woven wire-type known as "hardware cloth" and formed of sets of intersecting woven wires 24 extending perpendicular to one another and defining openings 26 (FIG. 3) therebetween on the order of one-half inch square (relatively enlarged in the drawing for the purpose of illustration).

Thus, when the hay bale 12 is supported on the screen 22, not only is the bale supported a substantial distance off the ground G (FIG. 2) to prevent damage to and deterioration of the hay due to ground moisture, snow and/or flooding, but air can flow beneath and through the bale to maintain the hay in a relatively dry condition. Further, when the hay bale 12 is supported on the screen 22, an integral upwardly projecting "spear" portion 14S of the vertical support shaft 14, which extends upward through a central set of the openings 26 in the screen, penetrates the bottom of the bale to thereafter retain the bale on the screen. The radius of the screen 22 also is larger than the radius of the bale 12, such as on the order of at least one-half foot, to reduce spillage of hay from around the periphery of the bale onto the ground G during the feeding process.

Figure 2:
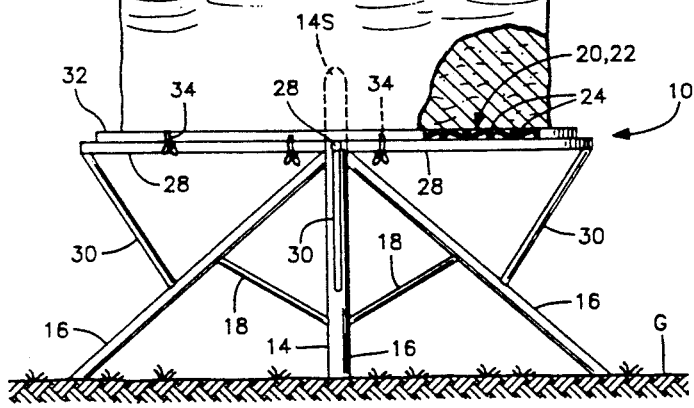
FIG. 2 is an elevational view of the livestock feeder.

The screen 22 rests on four horizontally and radially extending support members 28 also disposed at 90 degree intervals around the vertical support shaft 14 and in vertical alignment with respective ones of the inclined support legs 16. Inner end portions of the horizontal support members 28 are welded to the vertical support shaft 14 and/or the upper ends of the inclined support legs 16, as best illustrated in FIG. 2. Further, outer end portions of the horizontal support members 28 are supported by second brace members 30 also in vertical alignment with respective ones of the inclined support legs 16, with upper ends of the brace members being welded to the outer end portions of the respective ones of horizontal support members and lower ends of the brace members being welded to intermediate portions of the inclined support legs.

Additional stability to the outer end portions of the horizontal support members 28 is provided by a ring member 32 which is mounted on top of the outer end portions by welding, and within which the circular woven wire screen 22 is received. The woven wire screen 22 also may be welded to the horizontal support members 28 and the ring member 32 for additional stability, or secured to these members by suitable wire twists 34, as illustrated in FIGS. 2 and 3, so as to readily removable.

In general, the various members of the livestock feeder 10 as above described, may be of any suitable structural shape and size, so long as the feeder is relatively sturdy so as to be capable of supporting the hay bale 12, yet preferably light-weight, so as to be readily portable. For example, for one of the hay bales 12 having the above-mentioned diameter on the order of five feet and a weight on the order of five hundred pounds, the vertical support shaft 14 may be a cylindrical rod having a diameter of one and one-half inches; the inclined support legs 16 and the horizontal support members 28 may be cylindrical rods having a diameter of one inch; the first and second brace members 18 and 30 may be cylindrical rods having a diameter of ½ inch; the wires 24 of the woven wire screen or "hardware cloth" 22 may have a diameter of 1/16 inch; and the circular ring 32 may be formed of ⅜ inch cold rolled steel.

Figure 3:
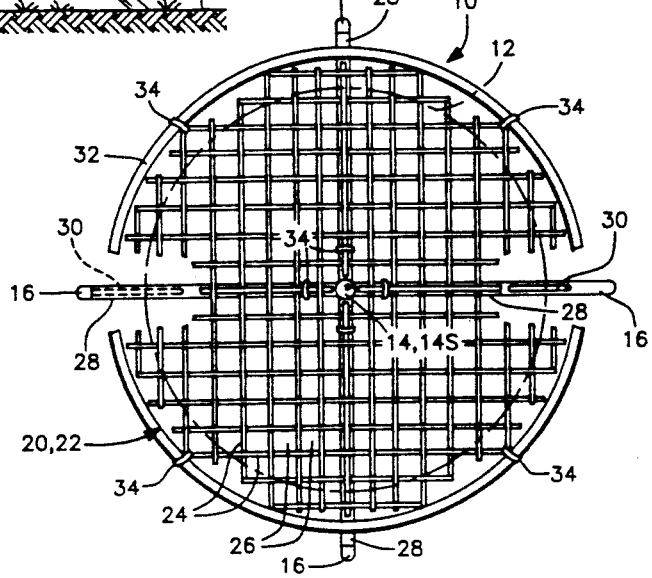
FIG. 3 is a plan view of the livestock feeder, with portions broken away.

In use, the round hay bale 12 may be positioned on the woven wire screen 22 as illustrated in FIGS. 2 and 3 by a tractor lift (not shown), with the bale, by its own weight, moving vertically downward to be "speared" and penetrated by the upwardly extending "spear" portion 14S of the vertical support shaft 14, which then retains the bale on the screen. In the alternative, the feeder 10 may be tipped onto its side, the hay bale 12 rolled into a position adjacent the screen, and the bale then pushed onto the "spear" portion 14S and the screen 22 by the tractor lift. The tractor lift then may be utilized to tip the thus-assembled feeder 10 and bale 12 to an upright position, as shown in FIG. 2.

In summary, a new and improved livestock feeder which is particularly adapted for feeding a round hay bale, such as the livestock feeder 10 for supporting the round hay bale 12, has been disclosed. The feeder 10 supports the hay bale 12 in a substantially elevated position off the ground G to reduce the loss of hay due to moisture, including snow and flooding, trampling and/or unsanitary conditions. The feeder 10 also is open around its periphery so as to preclude the possibility of entrapment of the heads of the livestock in the feeder, and the platform 20, in the form of the woven wire screen 22 upon which the hay bale 12 is supported, provides air circulation to the bottom of the bale and facilitates air flow through the bale, to retain the bale in a relatively dry condition, thus further reducing hay deterioration and loss. Further, the feeder 10 is of relatively sturdy, yet light-weight construction, with the only contact with the ground G being the lower ends of the vertical support shaft 14 and the inclined support legs 16, whereby the feeder is readily portable from one place to another even under frozen ground conditions.

It is to be understood that the foregoing description and accompanying drawing set forth the preferred embodiments of the invention at the present time. Various modifications, additions and alternative designs will, of course, become apparent to those skilled in the art in light of the foregoing teachings without departing from the spirit and scope of the disclosed invention. Therefore, it should be appreciated that the invention is not limited to the disclosed embodiments but may be practiced within the full scope of the appendant claims.

I claim:

1. A livestock feeder particularly adapted for feeding a round hay bale, which comprises:

a plurality of support legs having upper ends, at least some of the support legs being inclined to the vertical and being rigidly connected together adjacent their upper ends, and at least one of the support legs being a substantially vertical center support shaft having an upper end portion rigidly connected to upper end portions of the inclined support legs;

horizontal platform means mounted on the support legs adjacent their upper ends for supporting a hay bale in an elevated position with respect to the ground; and means for retaining the hay bale on the horizontal platform means.

2. The livestock feeder as recited in claim 1, wherein the inclined support legs are four in number.

3. The livestock feeder as recited in claim 1, wherein an extended portion of the vertical support shaft extends above the horizontal platform means for penetrating the hay bale and retaining the bale on the platform means.

4. The livestock feeder as recited in claim 1, which further comprises brace means for interconnecting portions of the inclined legs and the substantially vertical support shaft.

5. The livestock feeder as recited in claim 1, wherein the horizontal platform means is of partially open construction to permit air flow to the bottom of the bale.

6. The livestock feeder as recited in claim 1, which further comprises substantially vertically extending brace means for supporting outer portions of the platform means on portions of respective ones of the inclined support legs.

7. The livestock feeder as recited in claim 6, which further comprises horizontally disposed support members having inner end portions rigidly connected to upper end portions of the inclined support legs, the platform means being mounted on the horizontally disposed support members with the brace means secured to and extending between outer end portions of the support members and the respective portions of the inclined support legs.

8. The livestock feeder as recited in claim 7, wherein the hay bale retaining means includes at least one upstanding vertical shaft portion which penetrates into the bale when the bale is positioned on the platform means.

9. The livestock feeder as recited in claim 1, in which the hay bale retaining means includes upstanding vertical spearing means which penetrates into the bale when the bale is positioned on the platform means.

10. The livestock feeder as recited in claim 1, wherein the horizontal platform means is a horizontally disposed wire screen for supporting a bottom of the hay bale and permitting air flow to the bottom of the bale.

11. The livestock feeder as recited in claim 10, which further comprises substantially vertically extending brace means for supporting outer portions of the wire screen on portions of the inclined support legs.

12. The livestock feeder as recited in claim 11, which further comprises horizontally disposed support members having inner end portions rigidly connected to upper end portions of the inclined support legs, the wire screen being mounted on the horizontally disposed support members with the brace means secured to and extending between outer end portions of the support members and the respective portions of the inclined support legs.

13. The livestock feeder as recite din claim 12, wherein the inclined support legs are four in number.

14. The livestock feeder as recited in claim 12, which further comprises:
second brace means for interconnecting portions of the inclined support legs and the substantially vertical support leg.

15. The livestock feeder as recited in claim 14, wherein the substantially vertical support leg projects above the platform means for penetrating and retaining the hay bale on the platform means.

16. A livestock feeder particularly adapted for feeding a round hay bale, which comprises:
a plurality of support legs having upper ends, at least some of the legs being inclined to the vertical;
horizontally disposed support members having inner end portions rigidly connected to upper end portions of the inclined support legs;
horizontal platform means mounted on the horizontally disposed support members for supporting a hay bale in an elevated position with respect to the ground;
substantially vertically extending brace members secured to and extending between outer portions of the horizontally disposed support members and second portions of respective ones of the inclined support legs; and
means for retaining the hay bale on the horizontal platform means.

17. The livestock feeder as recite din claim 16, wherein the horizontal platform means is of partially open construction to permit air flow to the bottom of the bale.

18. A livestock feeder particularly adapted for feeding a round hay bale, which comprises:
a plurality of support legs having upper ends, at least some of the support legs being inclined to the vertical and rigidly connected together adjacent their upper ends;
horizontally disposed support members having inner ends rigidly connected to the upper end portions of the inclined support legs;
a horizontally disposed wire screen mounted on the horizontally disposed support members for supporting a bottom of the hay bale and permitting air flow to the bottom of the bale;
substantially vertically extending brace members secured to and extending between outer end portions of the horizontally disposed support members and second portions of the inclined support legs; and
means for retaining the hay bale on the wire screen.

19. The livestock feeder as recited in claim 18, wherein the hay bale retaining means includes upstanding vertical spearing means for penetrating into the bale when the bale is positioned on the wire screen.

* * * * *